April 2, 1940.                M. F. McLEOD                    2,195,421
              MACHINE FOR NAILING STRAPS TO BAND STICKS
                 Filed Sept. 22, 1937          9 Sheets-Sheet 1
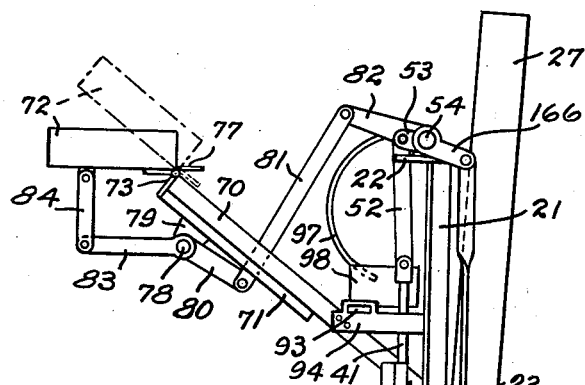
Fig. 1
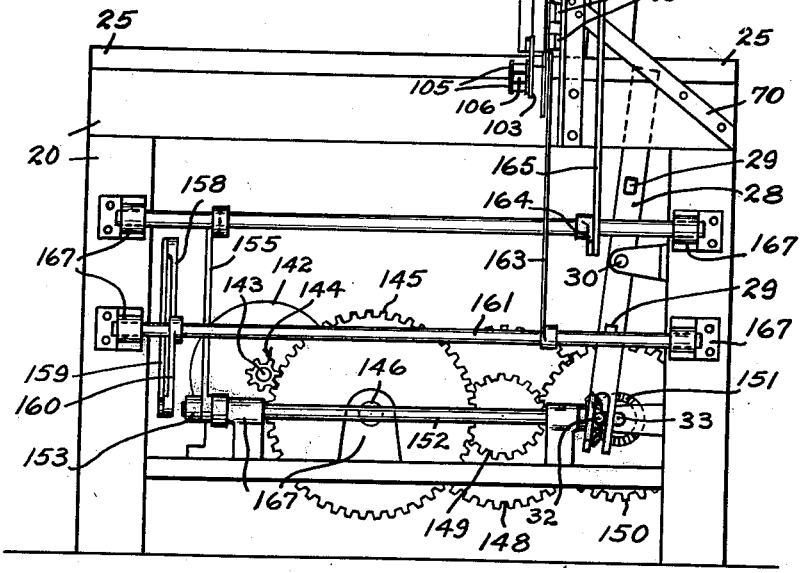
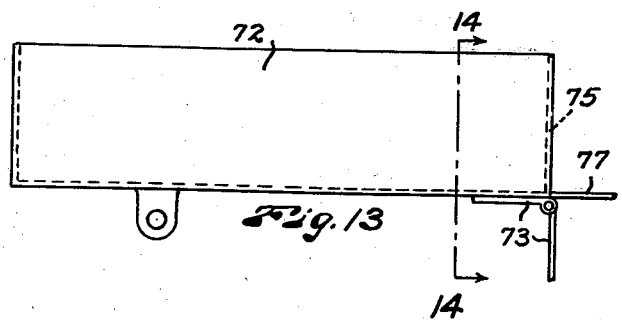
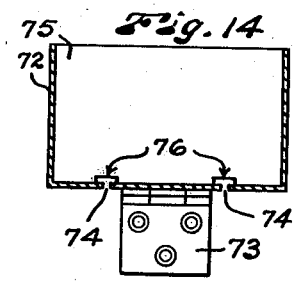
Fig. 13            Fig. 14
INVENTOR
Murdock F. McLeod
BY
G. Wright Arnold
ATTORNEY April 2, 1940. M. F. McLEOD 2,195,421
MACHINE FOR NAILING STRAPS TO BAND STICKS
Filed Sept. 22, 1937 9 Sheets-Sheet 2

INVENTOR
Murdock F. McLeod
BY
ATTORNEY

April 2, 1940.    M. F. McLEOD    2,195,421
MACHINE FOR NAILING STRAPS TO BAND STICKS
Filed Sept. 22, 1937    9 Sheets-Sheet 3
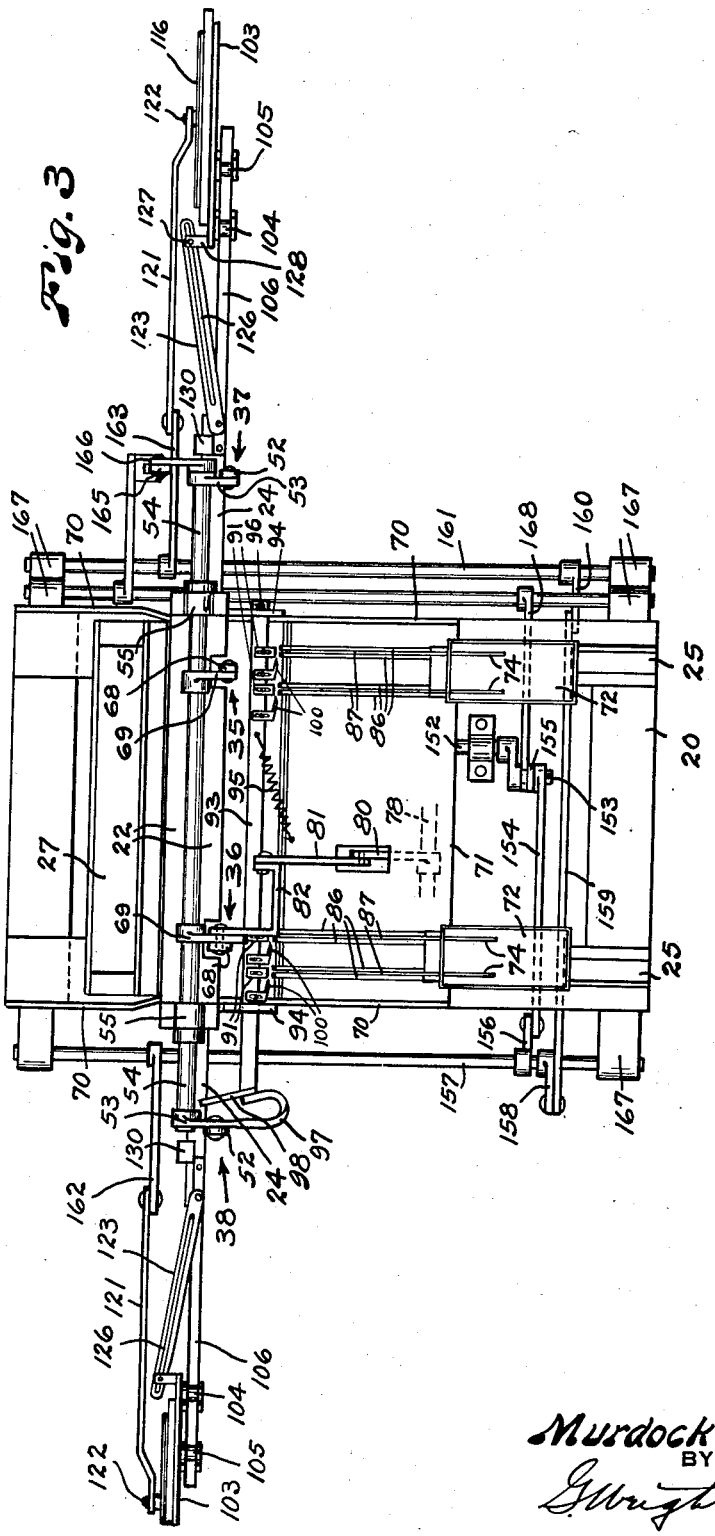
INVENTOR
Murdock F. McLeod
BY
G. Wright Arnold
ATTORNEY

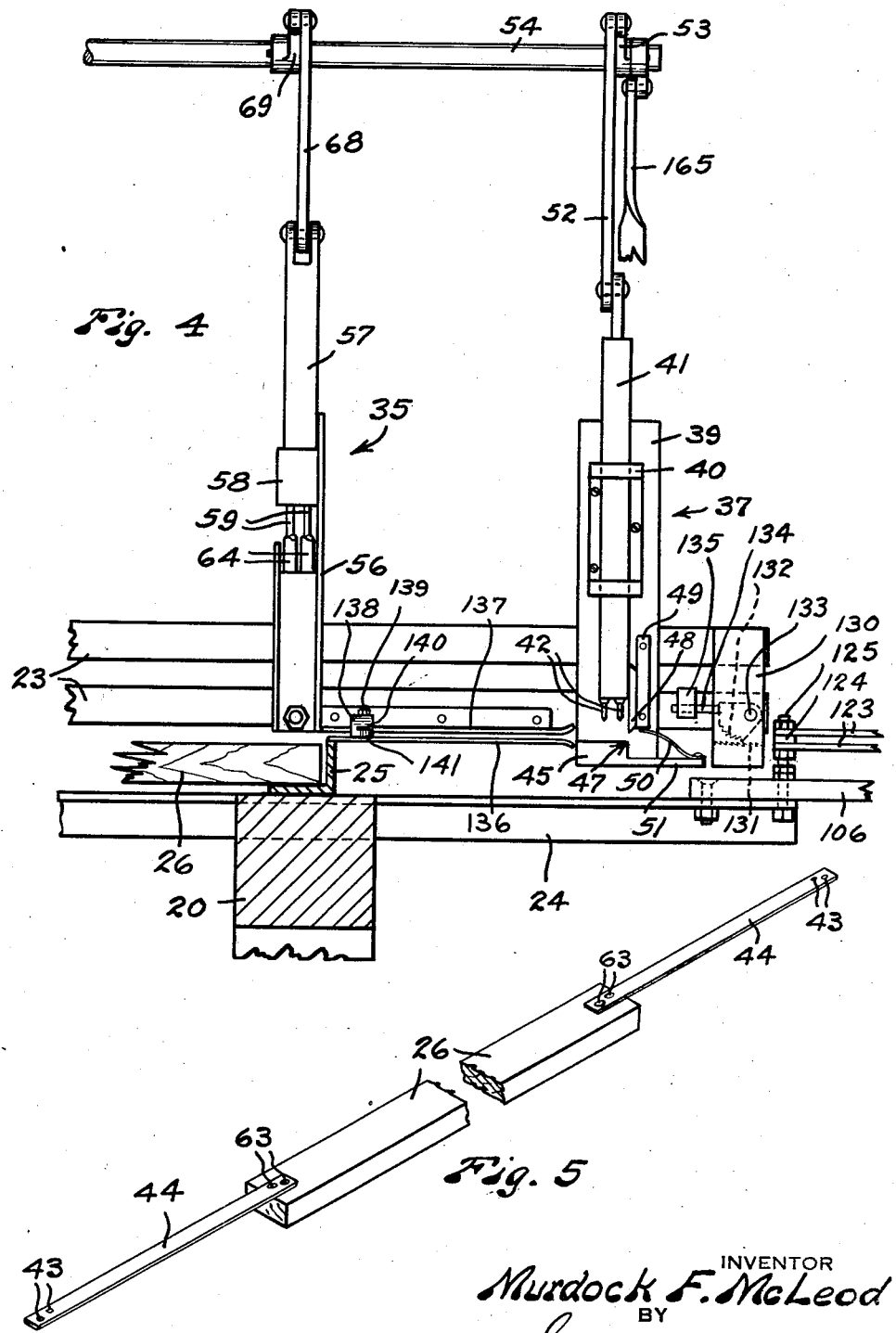

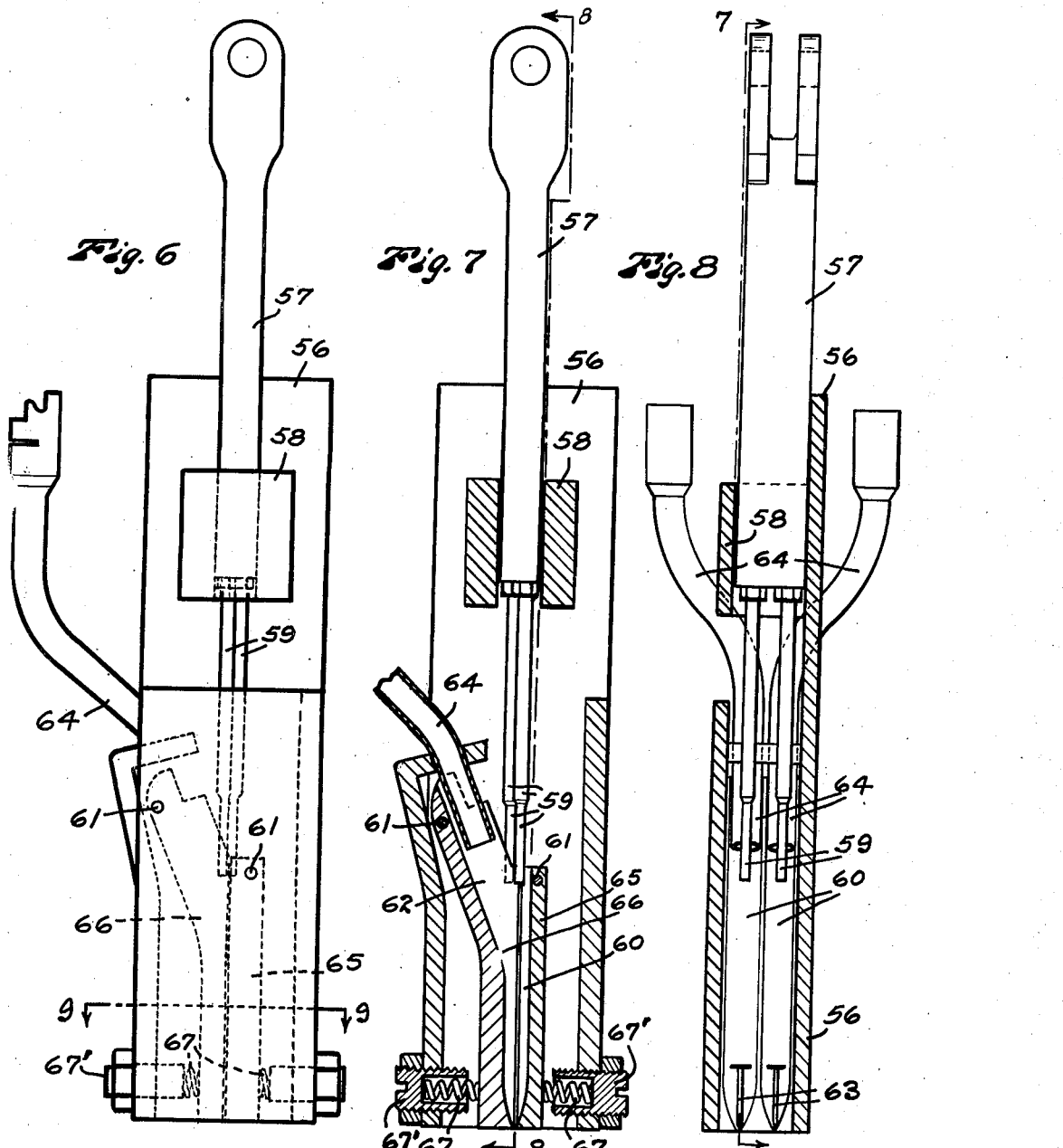

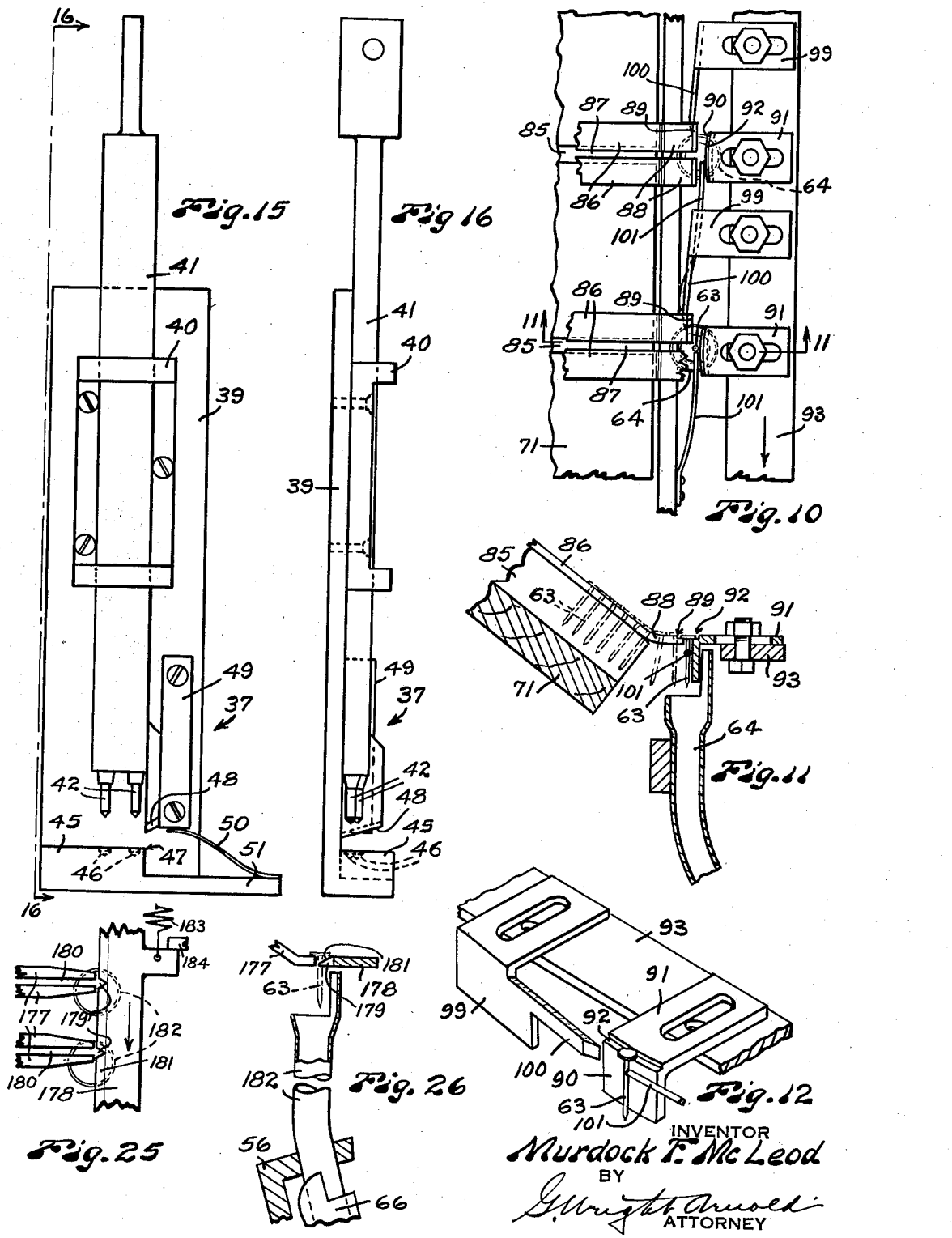

April 2, 1940.  M. F. McLEOD  2,195,421
MACHINE FOR NAILING STRAPS TO BAND STICKS
Filed Sept. 22, 1937   9 Sheets-Sheet 7
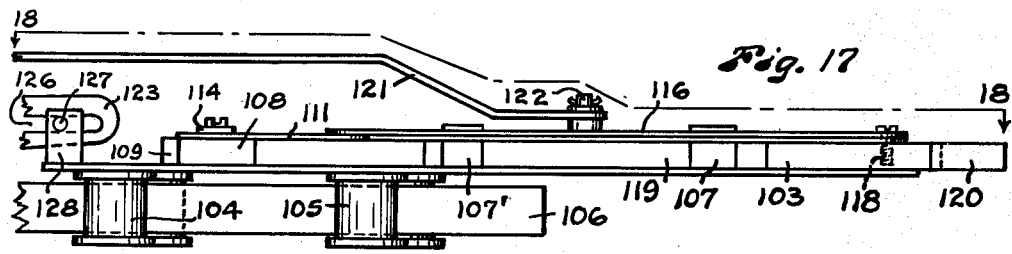
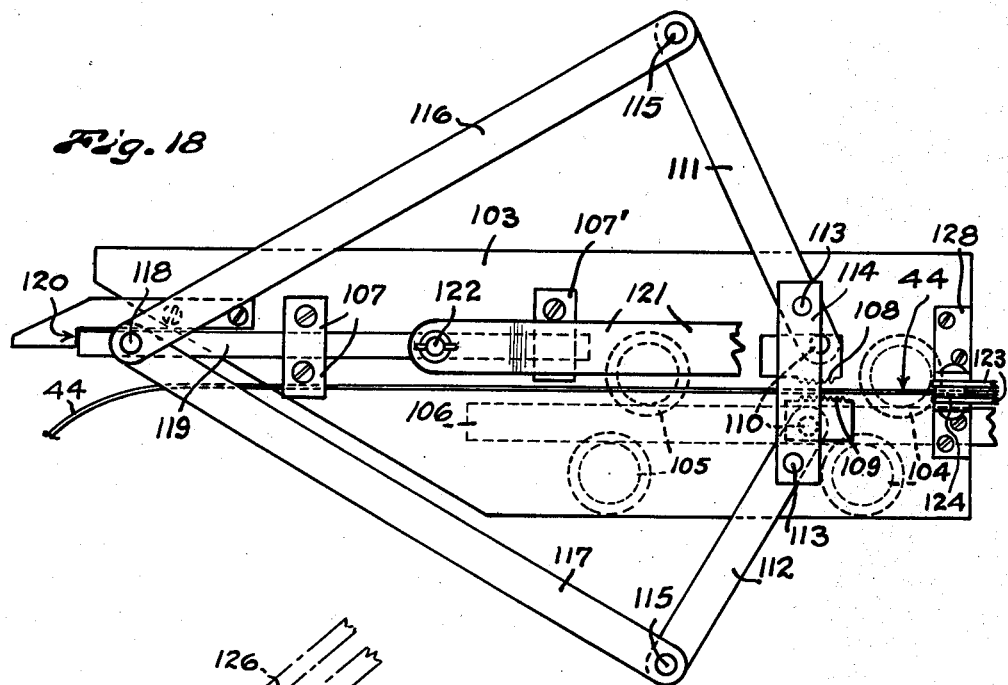
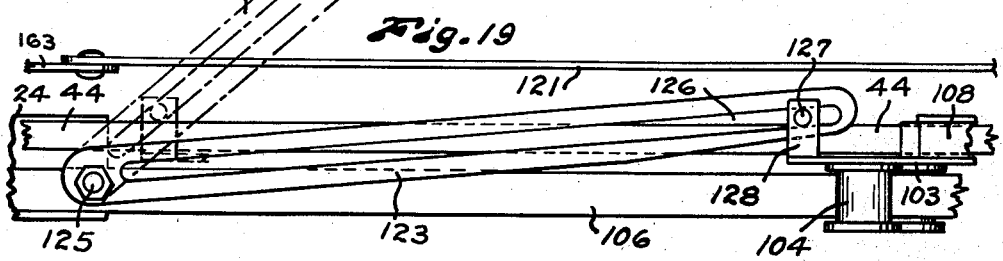
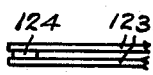
INVENTOR.
Murdock F. McLeod
BY
G. Wright Arnold
ATTORNEY April 2, 1940. M. F. McLEOD 2,195,421
MACHINE FOR NAILING STRAPS TO BAND STICKS
Filed Sept. 22, 1937 9 Sheets-Sheet 8

INVENTOR
Murdock F. McLeod
BY
G. Wright Arnold
ATTORNEY

April 2, 1940.　　　　M. F. McLEOD　　　　2,195,421
MACHINE FOR NAILING STRAPS TO BAND STICKS
Filed Sept. 22, 1937　　　9 Sheets-Sheet 9
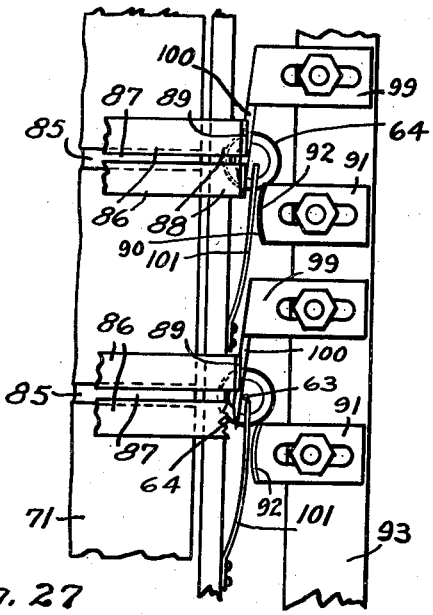
Fig. 27
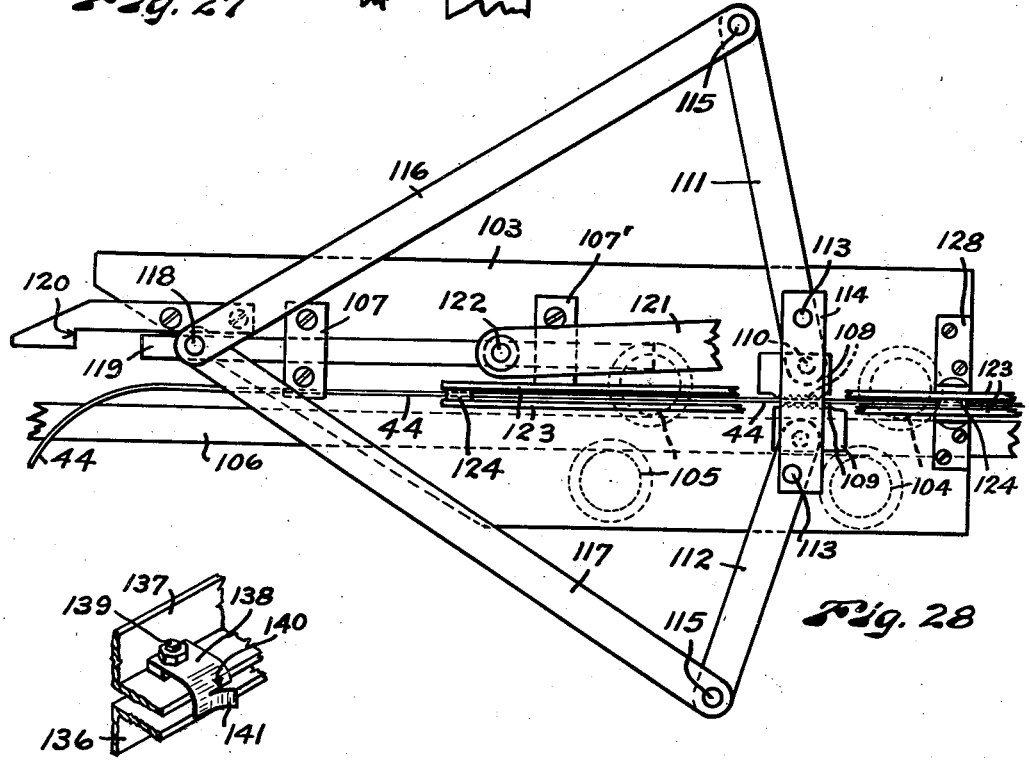
Fig. 28
Fig. 29
INVENTOR.
Murdock F. McLeod
BY
G. Wright Arnold
ATTORNEY.

Patented Apr. 2, 1940

2,195,421

UNITED STATES PATENT OFFICE 2,195,421

MACHINE FOR NAILING STRAPS TO BAND STICKS

Murdock F. McLeod, Tacoma, Wash.

Application September 22, 1937, Serial No. 165,132

9 Claims. (Cl. 1—1)

This invention relates to an automatic machine for nailing metal straps to the end portions of band sticks to be used for bundling wooden shingles.

A primary object of this invention is to provide an automatic machine comprising means for supplying, positioning and supporting the band sticks, means for positioning metal strap members in longitudinal alignment with the band sticks with the end portions of the strap members overlapping the end portions of the band sticks, means for nailing the overlapped end portions of the strap members to the band sticks and means for cutting off the strap members at a predetermined distance from the band sticks and for punching holes in the strap members adjacent the cut off end portions thereof.

In packing wooden shingles it is common practice to bind each bundle of shingles with two wooden band sticks, positioned on the top and bottom, respectively, of the bundle and extending across the bundle, and two metal strap members projecting over and nailed to the end portions of the band sticks and extending across the side or edge portions of the bundle. The band sticks and strap members are preferably supplied to the shingle packer who packs the shingles with the two strap members nailed to the respective end portions of one band stick and the outer end portions of the strap members each punched for the reception of two nails so that the packer may lay down a band stick with two metal strap members thereon, pack a bundle of shingles on said band stick, place another band stick across the top of the bundle of shingles, draw the metal strap members up past the sides of the bundle of shingles, bend the punched end portions of the strap members over the end portions of the upper band stick and nail said punched end portions of the metal strap members to the end portions of the uppermost band stick.

Heretofore it has been common practice to prepare these metal strap members for use by cutting them off to the desired length and punching both end portions of each strap member, and then nailing these cut and punched strap members, by hand labor, to the respective end portions of the band sticks which are to be used as the bottom band sticks for the bundles. The strap members are usually supplied to the shingle mills in cut and punched condition and the mills provide the band sticks and supply the labor necessary to nail one end portion of each strap member to a band stick before the strap members and band sticks go to the shingle packers. This process makes it necessary to put the strap members through a machine to punch and cut said strap members and to then hand nail the strap members to the band sticks, thus necessitating several operations, some of which are carried out by hand. This adds considerably to the cost of making the shingles ready for market.

It is an object of this invention to provide an automatic machine which will feed in the strap members and the band sticks, and which will cut the strap members to the proper length, nail one end of each strap member to a band stick and punch the other end of each strap member all at one time, thus speeding up the work and substantially reducing the cost of preparing the band sticks and metal strap members for use by the shingle packers.

Other objects of this invention are to provide simple and efficient feeding means for feeding or advancing wooden band sticks to a nailing position by moving them in a direction transversely of their length; to provide simple and efficient carriage means for feeding in metal strap members in directions parallel to the length of the strap members and band sticks and positioning said metal strap members in longitudinal alignment with the band sticks with their end portions overlapping the end portions of the band sticks; to provide simple and efficient nailing means for driving nails through the overlapped end portions of the metal strap members into the band sticks and to provide simple and efficient means for cutting off the metal strap members at a predetermined distance from the ends of the band sticks and punching said metal strap members adjacent their cut off ends.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Figure 1 is a side elevation of a machine constructed in accordance with this invention;

Fig. 3 is a plan view of said machine;

Fig. 4 is a fragmentary view in front elevation, on a larger scale than the preceding figures, showing a nail driving unit and a punch and cut off unit embodied in the invention, parts being shown in cross section;

Fig. 5 is a perspective view, with parts broken away, showing a band stick of the type used in bundling shingles with metal straps nailed to the respective ends of said band stick as they would be after the band stick had passed through this machine;

Fig. 6 is a detached side elevation of a nail driving device embodied in the invention;

Fig. 7 is a vertical sectional view of said nail driving device taken substantially on broken line 7—7 of Fig. 8;

Fig. 8 is a vertical sectional view of said nail driving device taken substantially on broken lines 8—8 of Fig. 7;

Fig. 9 is a cross section through said nail driving device taken substantially on broken line 9—9 of Fig. 6;

Fig. 10 is a fragmentary plan view of a portion of the nail picking mechanism by which nails are delivered to the nail driving device;

Fig. 11 is a fragmentary sectional view of the nail picking mechanism, taken substantially on broken line 11—11 of Fig. 10;

Fig. 12 is a detached perspective view of parts embodied in the nail picking mechanism;

Fig. 13 is a detached side elevation of a nail box embodied in the invention;

Fig. 14 is a cross sectional view of said nail box on line 14—14 of Fig. 13;

Fig. 15 is a detached front elevation of a combined punch and cut-off unit embodied in the invention;

Fig. 16 is a detached side elevation of said punch and cut off unit, looking in the direction indicated by line 16—16 of Fig. 15;

Figs. 17 and 19 are fragmentary detached plan views on a larger scale than Fig. 3 of parts of the carriage means shown at the right of Fig. 3 and used for advancing the metal strips;

Fig. 18 is a side elevation of the devices shown in Fig. 17 looking in the direction indicated by broken line 18—18 of Fig. 17;

Fig. 20 is a detached edge view of a fragment of the guide member shown in Fig 19;

Fig. 25 is a fragmentary plan view of a modified form of nail picking means; and Fig. 26 is a view partly in section and partly in elevation of the nail picking means shown in Fig. 25;

Fig. 27 is a fragmentary plan view similar to Fig. 10, showing parts of the nail picking mechanism in a different position from the position in which said parts are shown in Fig. 10; and more specifically in that phase of the operating cycle where a nail pickoff device is entered between a first and second nail;

Fig. 28 is an elevation similar to Fig. 18 showing parts of the carriage for advancing metal straps in a different position from the position in which said parts are shown in Fig. 18; and Fig. 29 is a detached perspective view of a spring member employed as a yielding guide means for metal straps which are to be secured to band sticks.

Figure 2:
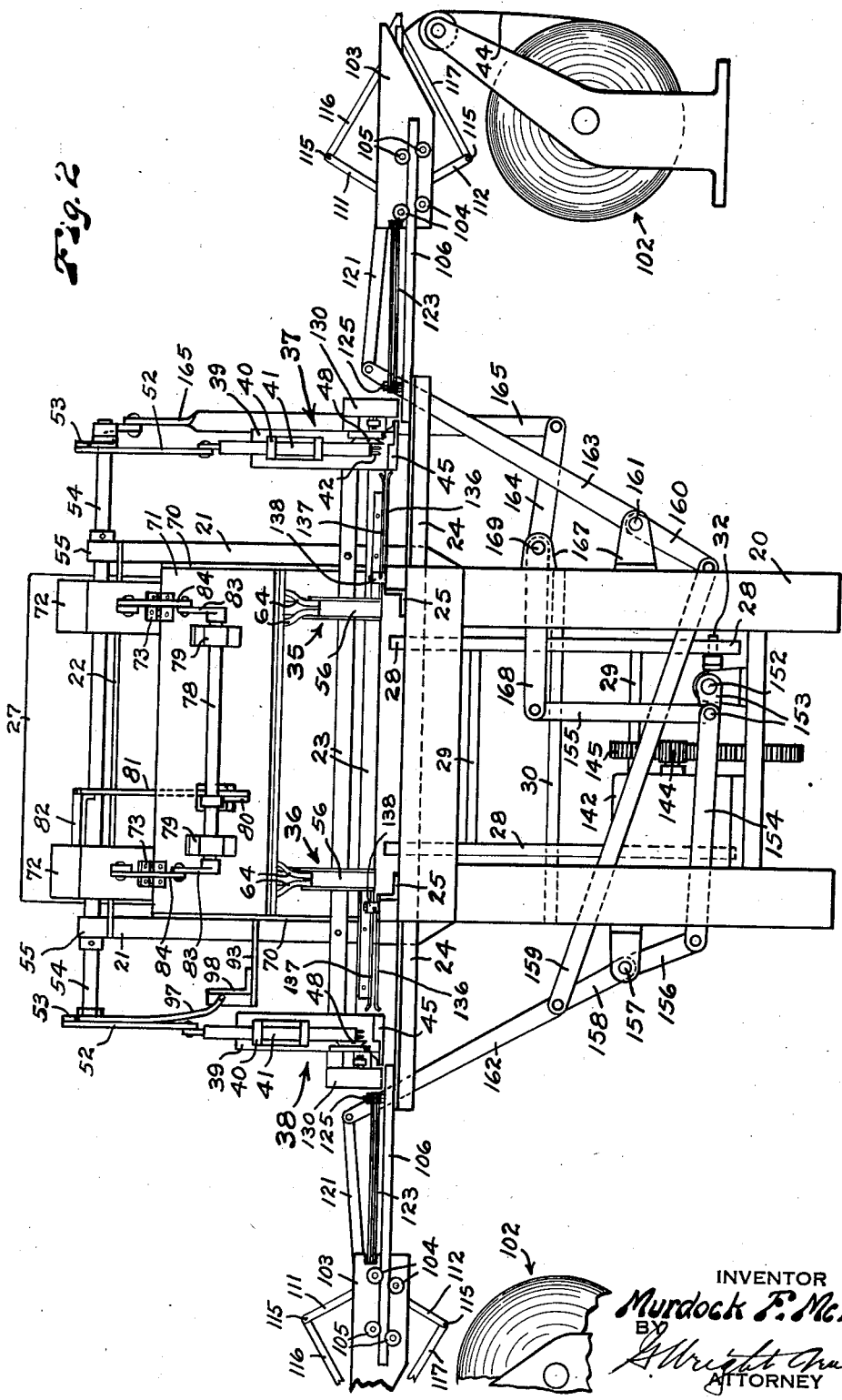
Fig. 2 is a front elevation of the same.
Figure 21:
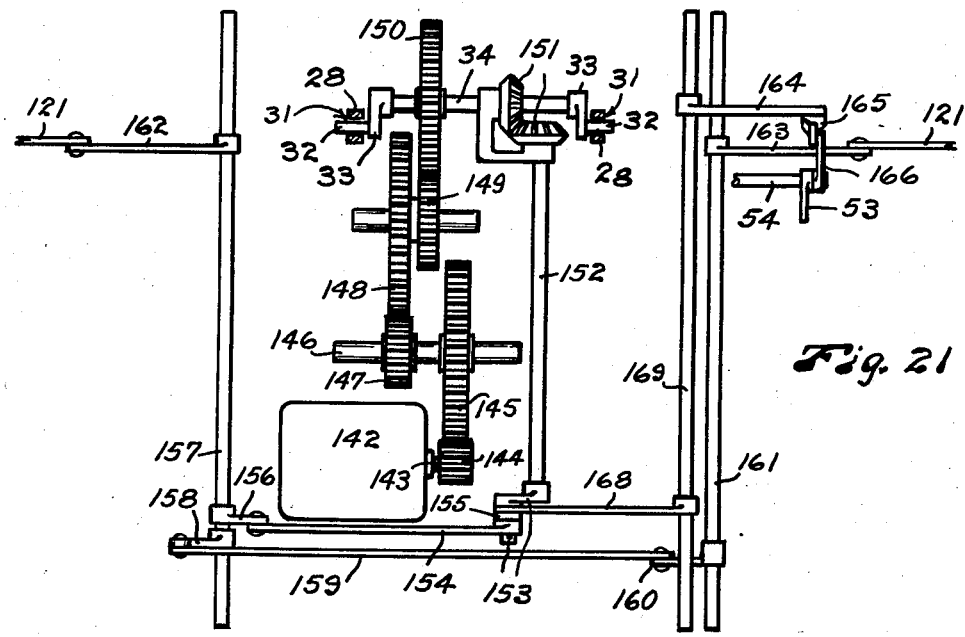
Fig. 21 is a somewhat diagrammatic detached plan view of parts of the driving mechanism shown in Figs. 1, 2 and 3, parts being omitted and broken away to illustrate the driving mechanism.

The machine comprises a main frame 20 of generally rectangular shape providing a horizontal table like portion upon which the work is done. Two upright frame members 21 extend upwardly from the sides of said main frame near the rear portion thereof and a plate 22 is secured to and supported on the upper portions of said upright frame members and extends crosswise of the machine. The upright frame members 21 and transverse plate 22 thus form a rigid frame of generally rectangular shape. Two transverse spaced apart frame bars 23 are secured to the upright frame members 21 a short distance above the plane of the top of the main frame and serve as supporting means for punch and cutter and nail driving mechanism, as hereinafter described. A transverse frame bar 24, preferably of T shaped cross section, extends crosswise of the main frame 20 a short distance forwardly of the upright frame members 21. The upper side of the T bar 24 is substantially flush with the top plane of the main frame, as shown in Figs. 2 and 4.

Figure 23:
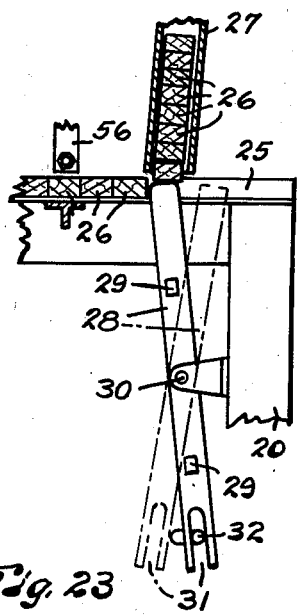
Fig. 23 is a detached view partly in elevation and partly in section illustrating band stock feeding mechanism.

Two band stick supporting members 25 of L shaped cross section are positioned on the main frame 10 in longitudinally extending spaced apart parallel relation. These band stick supporting members 25 extend substantially from the front portion to the rear portion of the main frame and rest upon the transverse T bar 24. These members 25 are adapted to support band sticks 26 of the conventional type and dimensions used in banding or bundling shingles. The dimensions of the band sticks 26 are ordinarily about 19¾ inches long, about 1½ inches wide, and about ¾ of an inch thick. The band stick supports 25 are positioned with their bottom flanges directed inwardly toward each other so as to receive and support the end portions of the band sticks and the upright flanges of the supports 25 are spaced apart a distance slightly more than the length of the band sticks so that they serve as guiding and positioning means for the band sticks. The band sticks are stored in an upright magazine 27 (Figs. 1 and 23) which is positioned adjacent the rear side of the upright frame members 21, said band sticks resting one upon another in face to face relation, and the ends of the lowermost band stick resting on the supporting members 25. An oscillatory band stick feeder is provided for feeding the band sticks forwardly on the band stick supporting members 25. This band stick feeder comprises two upright feeder bars 28 connected with each other by cross bars 29 and pivoted for oscillation on a transverse pivot shaft 30. The upper end portions of the feeder bars 28 are positioned at the proper height and location so that they will engage with the lowermost band stick and advance all of the band sticks on the supporting members 25 each time the upper end portions of said feeder bars move forwardly. The second band stick from the bottom of the magazine will always be above the plane of the upper ends of the feeder bars as said bars move forwardly, and said second band stick will drop onto the top ends of the feeder bars as soon as the lower band stick is moved out from under said second band stick and will then drop down onto the band stick supporting members as the feeder bars are retracted. The lower end of each feeder bar 28 has a slot 31 within which a crank pin 32 on a crank 33 is operatively disposed. The cranks 33 are secured to a shaft 34 which is driven in a manner hereinafter set forth. The mechanism just described operates to advance or feed forward the band sticks a distance equal to the width of one band stick on each forward movement of the upper end portions of the feeder bars 28. This provides for positioning and stopping each band stick for a predetermined period of time in a location directly beneath certain nailing means hereinafter described. The position occupied by each band stick during the nailing operation is substantially above the T bar 24 as shown in Fig. 23, the band stick in the nailing position being the third band stick in front of the bottom of the magazine 27 as shown in Fig. 23.

The transverse frame bars 23 extend beyond the upright frame members 21 on both sides of the machine and serve as a supporting means for two nailing units, designated generally by 35 and 36, and two punch and cut-off units, designated generally by 37 and 38, see Figs. 2, 3, 4, 6, 7, 8, 9, 15 and 16. Each punch and cut-off unit, Figs. 2, 4, 15 and 16 comprises a frame plate 39 secured to the bars 23 and provided with a guide 40 for slidably receiving and guiding a vertically reciprocable punch plunger 41. Each punch plunger 41 supports two punch members or dies 42 which extend downwardly from the bottom end portion thereof. These punch members 42 are spaced apart and are offset sidewise relative to each other, as shown in Figs. 4, 15 and 16, so that the holes 43 punched thereby, see Fig. 5, in the end portion of a metal strap or band iron 44 will not be in longitudinal alignment with the band stick 26 to which the band iron 44 is attached. A die block 45 is rigid with the punch frame 39 and positioned below the punch members 42. Recesses 46 are provided in the die block 45 in vertical alignment with the punch members 42. The shape of the holes 43 is not important as long as the punch members break through the metal straps 44 enough to permit easy driving of nails 63. A cutting edge 47 is provided on the die block 45 for cooperation with a knife 48, which is secured to the punch plunger 41. A guide plate 49 is positioned back of the knife 48 to support said knife 48 in shearing relation relative to the die block 45. A flat spring 50 is secured to a base flange 51 of the punch frame 39 to hold the end portion of an incoming metal strap 44 in elevated position and prevent said end portion of said strap 44 from striking against the end of the die block which cooperates with the knife 48. When the knife and metal strap 44 are moved downwardly to cut off the metal strap, the elevated end portion of the spring 50 is depressed and said spring 50 then moves upwardly along with the knife and moves the end portion of the metal strap upwardly with it. As the metal strap 44 is fed longitudinally into the machine it slides between the spring 50 and the bottom end portion of the guide plate 49. Preferably the cutting edge of the knife 48 is inclined, as shown in Fig. 16, to provide a shearing cut. The base flange 51 is positioned below the plane of the top of the die block 45 and the spring 50 slopes from this base flange 51 upwardly to the lower end portion of the die block. The means for reciprocating each punch plunger comprises a link 52 having its lower end portion pivotally connected with the punch plunger 41 and its upper end portion pivotally connected with a lever arm 53 which is secured to a rock shaft 54. The rock shaft 54 is mounted for oscillation in suitable bearings 55 which are secured to the transverse frame plate 22, see Figs. 2 and 3. The punch and cut off units and the nailing units and the nail sorting and supply means are all operated from the rock shaft 54.

Each nailing unit 35 and 36 comprises a frame member 56, Figs. 2, 4, 6, 7, 8 and 9, secured in an upright position to the transverse frame bars 23 at locations above the end portions of the band sticks 26 where the end portions of the metal strap members 44 are to be nailed onto the band sticks. A vertically reciprocable driving member 57 is guided for vertical movement in guide means 58 on each frame member 56 and two spaced apart nail driving plungers 59 are secured to each driving member 57 and extend downwardly therefrom into two passageways 60 in two nail holding chuck members 65 and 66, which are supported by pivot means 61. The passageways 60 communicate with two inclined passageways 62, which are adapted to have nails 63 delivered thereinto from inclined tubes 64. The tubes 64 each receive nails 63, one at a time, from nail picking means hereinafter described. Each nail 63 passes down the tube 64 into which it is delivered, and thence down one of the passageways 62—60 until the point of the nail rests in an opening of smaller diameter than the nail, provided between the two yieldingly supported chuck members 65 and 66, see Figs. 7, 8 and 9. Each nail 63 is thus supported in a vertical position below one of the nail driving plungers 59 and above the end portion of a metal strap member 44 which overlaps the end portion of a band stick 26. The nails enter the passageways 60 below the driving plungers 59 while the driving plungers 59 are in an elevated position, and when the nail driving plungers make their downward stroke they engage with the head portions of the nails, force the nails down through the chuck members 65 and 66 and drive said nails through the metal strap 44 and into the band stick 26, thus securing the end portion of a metal strap 44 to the end portion of a band stick 26 by two nails driven through the metal strap and into the band stick. The chuck members 65 and 66 are movable on pivots 61 and are yieldingly supported by compression springs 67 and said jaw members move apart to permit the head of the nail and the plunger to pass downwardly therethrough as the nail is driven. Tubular screws 67' are provided for adjustably supporting the springs 67 and limiting the swinging movement of the jaw members. The upper end portion of the driving member 57 of each nailing unit 35 is connected by a link 68 with a lever arm 69 which is secured to the rock shaft 54.

The nails 63 are relatively short and small and are light in weight and the nail sorting and nail picking means must be accurately constructed to handle these nails. The nails 63 are delivered to the inclined tubes 64 by nail positioning and picking means, which is supported by two inclined frame bars 70 secured to the main frame 20 and upright frame members 21. The frame bars 70 extend forwardly and upwardly and an inclined cross member 71, preferably of wood of substantial thickness, is secured to and supported by the frame bars 70 and extends across the machine. A nail box 72, Figs. 1, 2, 3, 13 and 14, is secured by a hinge 73 to the edge of the cross member 71 in alignment with each nailing unit. Each nail box 72 has two parallel slots 74 in its bottom toward the forward end thereof. These slots are large enough to permit the shank portions of the nails 63 to pass through them, but will not permit the passage therethrough of the nail heads. An end wall 75 is provided in each nail box 72 at substantially the location of the hinge. This end wall 75 extends across the slots 74, and, at the location of the slots 74, said end wall 75 is provided with notches 76, Fig. 14, which afford just enough clearance to permit the heads of nails 63 moving in the slots 74 to pass therethrough. The bottom of each nail box is provided with an extension 77 which projects beyond the end wall 75 and beyond the hinge means 73 and overlaps the adjacent portion of the cross member 71. When the nail box 72 is oscillated on the hinge means 73 the extension 77 moves up and down relative to the cross member 71 between the position shown by full lines and the position shown by broken lines in Figure 1. The slots 74 extend to the end of the extension 77.

Means is provided for oscillating both of the nail boxes 72 to agitate and shake up the nails and cause said nails to drop into the slots and hang point downward. This nail box oscillating means, see Figs. 1, 2 and 3, comprises a shaft 78 positioned below the cross members 71 and journaled in bearings 79, which are secured to the bottom side of said cross member 71. The shaft 78 has a lever arm 80 secured thereto and connected by a link 81 with a lever arm 82 on the rock shaft 54. This provides means for oscillating the shaft 78. Two other lever arms 83 on the shaft 78 are respectively connected by two links 84 with the respective nail boxes 72. This provides means for communicating the oscillating motion of the shaft 78 to the nail boxes 72.

The cross member 71 is preferably of wood and the thickness of this cross member is greater than the length of the nails 63. Slots 85, see Figs. 3, 10 and 11, are provided in the cross member 71 in alignment with the four slots 74 in the nail boxes 72 and extensions 77. These slots 85 provide clearance for the nails 63. Two metal plate members 86 are secured to the top side of the cross member 71 at the location of each of the four slots 85. Two metal plate members 86 of each pair of said plate members are spaced apart far enough to provide a slot 87 therebetween which registers with the adjacent slot 85 in the cross member 71. The nail heads rest on the plate members 86 and the nails 63 are thus suspended by their heads, and move downwardly along the slots 85 and 87. The plate members 86 are inclined, throughout the greater portion of their length, at the same angle as the cross member 71, but the lower end portions of said plate members are bent so that they will provide short end sections 88 which are substantially horizontal over which the nails 63 will travel as they pass off of said plate members. Notches 89 of shallow depth are provided in the tips of the end sections 88 for the head of the foremost nail to drop into when its movement is arrested just before it drops off of the end sections 88 of the plate members 85. When one portion of the head of a nail 63 is positioned in the notches 89 said nail is supported by and rests against a curved surface 90, see Figs. 10, 11 and 12, of a movable nail holding member 91 and another portion of the head of such nail rests in a notch 92 in the nail holding member 91. Four of the nail holding members 91 are provided and each nail holding member 91 is secured to a transverse bar 93 which extends crosswise of the machine adjacent the tip portions of the plate members 86. The transverse bar 93 is slidably supported in guide means 94 for reciprocating movement, see Figs. 1, 2 and 3. A spring 95, Fig. 3, yieldingly urges the bar 93 in one direction. Stop means 96 limits the movement of the bar 93 in the direction in which it is urged by the spring 95. The spring 95 normally holds the bar 93 in such a position as to cause the nail blocking members 91 to stop the forward movement of the nails 63. The bar 93 is moved to the right from the position shown in Fig. 3 by a cam member 97 which is secured to the rock shaft 54 and positioned to engage with a plate member 98 that is secured in an angular position to one end portion of the bar 93. Oscillation of the rock shaft 54 will move the cam member 97 over the plate member 98 and this will move the bar 93 to the right from the position shown in Fig. 3. The cam member 97 shown in the drawings is secured to one of the lever arms 53. The bar 93 will be moved to the right from the Fig. 3 position while the nail driving plungers 59 are being moved downwardly. The nails 63 are released after the plungers 59 have moved down into passageways 60 and preferably when the plungers are near their lowermost positions. The nails will slide down the tubes 64 and enter the passageways 60 at about the time the plungers 59 are withdrawn therefrom. If the nails strike against the plungers 59 as said plungers are moving upwardly, the downward movement of the nails may be momentarily arrested but said nails will move on down to the position shown in Fig. 7 as soon as the plungers move out of the way.

To help in the delivery of the first or foremost nail in each slot 87 into the adjacent inclined tube 64 which leads down to the nail driving chuck 61 and to hold back all of the nails except the first nail, I provide four nail pick off devices 99, Fig. 3, of the form shown in Figs. 10, 11 and 12. Each nail pick off device 99 is secured to the bar 93 and has a chisel shaped end portion 100 which is adapted to enter between the foremost nail and the second nail when the bar 93 (Fig. 3) is moved to the right by the cam member 97. Each nail pick off device 99—100 is inclined, as shown in Figs. 10, 12 and 27, so that it will be clear of the first nail when the tip thereof enters between the first and second nail, see Fig. 10, and will engage with the first nail as said pick off device enters further between the first and second nail, see Fig. 27, and move said first nail outwardly a short distance to insure that the head of the first nail will clear the ledge 89 at the end of the members 86. As each nail pick off device 99 and each nail blocking member 91 is secured to the bar 93 they will move simultaneously and the nail blocking member will release or move out of the way of the foremost nail just after the nail pick off device has moved in behind the foremost nail and in front of the second nail. The result is that the foremost nail is released and pushed forwardly and dropped into the adjacent inclined tube while the other nails are held back until after the nail blocking member 91 has been returned to its nail blocking position. The nails are preferably released in that portion of the cycle of operation of the machine in which the nail driving plungers are near the lower limits of their driving strokes, so that said nails will have ample time to slide down the inclined tubes 64 and passageways 62—60 and find their proper positions in the chucks 65 and 66 as the driving plungers are moving upwardly and before the driving plungers move downwardly in the next driving operation. To prevent the foremost nail 63 from being carried sidewise by the blocking member 91 or pushed sidewise by the nail pick off device 100, as said nail pick off device enters between the first and second nail I provide a spring wire 101 which is secured to the cross member, a non-movable part of the machine, and extends into line with the foremost nail 63 so that the relatively square end of said spring wire 101 will be substantially against the side of the foremost nail 63 opposite to the side which is first engaged by the nail pick off device 100. This spring wire 101 rests against the surface 90 of the nail blocking member 91 and will always be in the correct position to prevent sidewise movement of the foremost nail 63.

Figs. 25 and 26 illustrate a modified form of nail picking means for delivering one nail at a time into the tubes which lead to the nail driving chucks, said nail picking means being reliable and efficient in operation and being more simple and compact in construction than the devices illustrated in Figs. 10, 11 and 12.

The device illustrated in Figs. 25 and 26 comprises two spaced apart inclined nail supporting members 177 which support the nails by their heads in the same manner as the nail supporting members 86 shown in Figs. 10 and 11. The nail supporting members 177 are narrow at their lowermost or forward ends. A bar 178 corresponding to the longtiudinally movable bar 93 is positioned with one edge closely adjacent to the ends of the nail supporting members 177. Notches 179 are provided in the edge of the bar 178 in a position so that one of said notches will register with the slot 180 between each pair of nail supporting members 177 when the bar is in the position of rest, shown in Fig. 25, which said bar will normally assume. Each notch 179 is just large enough and deep enough to receive the shank of a nail 63 so that when the bar 178 is moved longitudinally a nail 63, which is positioned in said notch, will be carried sidewise by the bar 178 out of alignment with the nail supporting members 177. The upper edge of the bar 178 at the location of the notches 179 is beveled as indicated by 181, see Fig. 26, so that as soon as the bar 178 is moved endwise far enough so that the nails in the notches 179 are clear of the ends of the nail supporting members 177, said nails will move, by gravity, sidewise the required distance for the nail heads to clear the bar 178 and the nails 63 will drop into tubes 182. The tubes 182 are substantially the same as the tubes 64, except that they preferably extend in as nearly a straight line as possible downwardly to the nail driving chuck means 66. To provide for making the tubes 182 substantially straight and vertical, it is necessary to place the bar 178 substantially directly above the nail driving devices. The bar 178 is preferably urged into the position of rest shown in Fig. 25 by a tension spring 183, which yieldingly urges said bar 178 against a stop 184. The bar 178 may be moved in the direction indicated by the arrow in Fig. 25, to release the nails, by cam means, not shown, which is similar to the cam means 97—98 used to move the bar 93.

The metal strap feeding devices, see especially Figs. 2, 3, 17, 18, 19, 20 and 28, are adapted to take the metal strap material from rolls 102, Fig. 2, and feed the correct amount of said strap material into the machine at the proper time in each cycle of operation of the machine. These strap feeding devices are in duplicate on each side of the machine and the following description will apply to the strap feeding device on either side of the machine. Each strap feeding device comprises a carriage plate 103 having two sets of rollers 104 and 105 rotatably mounted on one side thereof. The two sets of rollers 104 and 105 are spaced apart longitudinally of the carriage plate and the two rollers of each set are spaced apart vertically to receive therebetween a horizontal track bar 106 upon which the carriage is movably supported. The track bar 106 is fixedly secured to the outer end portion of the T bar 24, see Figs. 2, 3 and 4, and extends outwardly therefrom. The rollers 104 and 105 preferably have end flanges to prevent sidewise displacement of said rollers from the track bars 106. On the sides opposite the rollers 104 and 105 the carriage plates have means for receiving, guiding, and releasably clamping the metal straps 44 which are being taken off of the rolls 102. This strap guiding and clamping means comprising a guide member 107, Figs. 18 and 28, through which the strap 44 extends, and two jaw members 108 and 109 between which the strap 44 passes. The jaw members 108 and 109 preferably have teeth or serrations on the sides which grip the metal strap when the parts are in the position shown in Fig. 28 and release said metal strap when the parts of in the position shown in Fig. 18. These jaw members 108 and 109 are secured by pivots 110 to the respective ends of levers 111 and 112. The levers 111 and 112 are fulcrumed on pivots 113 which are secured to the carriage plate 103. Preferably a guide plate 114 is positioned outwardly from the levers 111 and 112 and supported on the pivots 113. This guide plate prevents the metal strap 44 from being displaced from between the jaws 108 and 109. The outer ends of the levers 111 and 112 are connected by pivots 115 with the ends of link 116 and 117, respectively. The links 116 and 117 extend outwardly and are convergently inclined toward each other and the outer end portions of said links are overlapped and secured by a common pivot 118 to a slide member 119. The slide member 119 is slidably supported in guide members 107 and 107', the guide member 107 being the same guide member 107 through which the metal strap 44 passes. The slide member 119 is movable longitudinally of the carriage plate 103, and the movement of said slide member 119 imparts a toggle motion to the links 116 and 117, which angularly moves the levers 111 and 112, thus moving the jaws 108 and 109 toward and away from each other and clamping or releasing the metal strap 44. Movement of the slide member 119 relative to plate 103 in an outward direction is limited by a fixed stop 120 provided on the outer end portion of the carriage plate 103, and movement of said slide member 119 relative to the plate 103, in an inward direction, is limited by clamping engagement of the jaws 108 and 109 with the strap 44. The entire carriage means, including the slide members 119, is adapted to be reciprocated by a connecting rod 121, which has one end portion connected by pivot means 122 with the slide member 119. The driving mechanism for the connecting rod 121 is hereinafter described.

The metal strap 44 is relatively thin and flexible and it is necessary to guide and support said metal strap between the jaw members 108 and 109 and the location where said metal strap 44 passes through the punching and cutting dies. This distance through which the metal strap 44 must be guided is variable due to the reciprocatory movement of the carriage, and the metal strap 44 is advanced past this location by pushing. Consequently if said strap 44 is not properly supported at this location it will bend and buckle. The guide means provided for the metal strap 44 at this location comprises two straight flat plate members 123, see Figs. 19 and 20, supported in spaced apart relation by spacer means 124 and adapted to receive the strap member 44 therebetween. Two plate members 123 have their inner end portion supported on a common pivot 125 which is secured to a fixed part of the machine as to the T bar 24. These plate members 123 have a longitudinally extending slot 126 through which a pin 127 is slidably and operatively disposed. The pin 127 is supported in a guide means 128 which is secured to the carriage plate 103. The metal strap member 44 passes from the jaw members 108 and 109 to the guide means 128 and enters between the plate members 123 at the location of said guide means 128. The pivot 125 is positioned on one side of the path of the metal strap 44 and the pin 127, which extends through the slot 126 in the plates 123, is positioned on the other side of the path of said metal strap 44. When the carriage assembly is at the outer limit of its stroke, the plate members 123 will be positioned almost parallel with the track bar 106, as shown by full lines in Figs. 3 and 19, and the strap member 44 will be supported between said plate members throughout substantially the entire distance between the jaw members 108 and 109 and the adjacent punch and cut off unit 37 or 38. As the carriage assembly is moved inwardly the plate members 123 will be moved angularly about the pivot 125 until they occupy a position at a substantial angle to the track bar 106, see dot and dash line position, Fig. 19, when the carriage is at the innermost limit of its travel. Throughout the inward movement of the carriage the plate members will always support the metal strap 44 and prevent it from bending and buckling while said metal strap member is being pushed inwardly preparatory to the next nailing, punching and cut off operation.

A strap gripping device, see Fig. 4, is positioned just outwardly from each punch and cut off unit. Each of these strap gripping devices is adapted to permit free inward movement of the metal strap therethrough, but to prevent outward movement of said metal strap therethrough. Each of these strap gripping devices comprises a fixed frame 130 having a fixed jaw 131 and a movable jaw 132 mounted on a pivot 133. A lever arm 134 is connected with the movable jaw 132 and a weight 135 is provided on the lever arm 134 to hold the movable jaw 132 in contact with the metal strap 44. When the metal strap 44 is pushed inwardly by inward movement of the carriage it will move freely through the jaws 131 and 132, but when the carriage is moved outwardly the jaws 131 and 132 will grip and hold the metal strap and prevent outward or retractile movement of said metal strap on the outward movement of the carriage.

Two fixed spaced apart guide plates 136 and 137, see Figs. 4 and 29, are provided for the metal strap member 44 between each punch and cut off unit and the adjacent nailing unit. A curved spring member 138 (Figs. 2, 4, and 29) is secured, by a bolt 139, to the upper guide plate 137 near the nailing unit and extends outwardly and downwardly in front of the guide space formed between said guide plates. This spring 138 helps to guide and position the metal strap member as said strap member is being pushed into the proper position for nailing and said spring is sufficiently flexible so that it will yield enough to release the strap member 44 after said strap member has been nailed to a band stick 26 and cut off and when said band stick 26, together with the strap member, is moved forwardly in the machine by forward movement of the feeder bars 28. A portion 141 of said spring 138 is partially cut loose from the spring 138 by a slot 140 and is bent outwardly so that the end portion of the metal strap will be deflected into proper position in the guide members if it engages with said outwardly bent portion 141.

One type of driving mechanism which may be used in connecion with this machine is somewhat diagrammatically shown in Figs. 1, 2, 3 and 21. This driving mechanism comprises a motor 142 having a shaft 143 provided with a gear pinion 144 which meshes with a relatively large gearwheel 145. The gearwheel 145 is secured to a shaft 146 which also has a gear pinion 147 secured thereto. A larger gearwheel 148 meshes with the pinion 147. Another gearwheel 149 is fixedly connected with the larger gearwheel 148 and meshes with still another gearwheel 150 which is secured to the shaft 34. The shaft 34 is connected by bevel gears 151 with a shaft 152, which extends toward the front of the machine. A crank 153 is secured to the forward end of the shaft 152. Two links 154 and 155 are connected with the crank 153. The link 154 extends in a generally horizontal direction and is connected with a downwardly extending lever 156 which is secured to an oscillatory shaft 157. An upwardly extending lever 158 on the oscillatory shaft 157 is connected by a link 159 with a downwardly extending lever 160 on another oscillatory shaft 161 which is positioned on the opposite side of the machine, whereby the two oscillatory shafts 157 and 161 are connected together for simultaneous movement in opposite angular directions. The two oscillatory shafts 157 and 161 extend toward the rear portion of the machine and are respectively provided with upwardly extending cranks 162 and 163. The cranks 162 and 163 are respectively connected with the connecting rods 121, which extend to the respective carriages or strap feeding devices on the two sides of the machine. This link and lever mechanism, just described, provides means for simultaneously moving the two strap feeding carriages outwardly to grip a new section of metal strap 44 and inwardly to feed said strap 44 into the machine in the proper position for nailing.

The link 155, which has one end connected with the crank 153, extends upwardly and is pivotally connected with a lever 168 secured to a shaft 169, which is also adapted to be oscillated. The shaft 169 extends rearwardly and has another lever 164 secured thereto. The last mentioned lever 164 is connected by a link 165 with a lever 166 on the end of the rock shaft 54, hereinbefore described, whereby said rock shaft will be oscillated synchronously with the movement of the strap feeding carriages.

The several shafts hereinbefore described are provided with suitable bearings, some of which are designated by numeral 167 in Figs. 1, 2 and 3.

It will be understood that the driving mechanism hereinbefore described may be greatly modified and varied without departing from the spirit of the invention.

Figure 22:
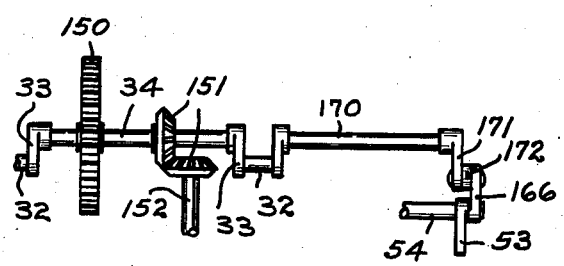
Fig. 22 is a fragmentary plan view showing a modification of the driving mechanism.

A modified form of one part of this driving mechanism is shown in Fig. 22. In this modified form the crank shaft 34 has an axially aligned extension shaft 170 which is connected with one of the crank pins 32. This extension 170 is provided with a crank 171 which is connected by an upright connecting rod or link 172 with the lever arm 166 on the rock shaft 54, the link 172 replacing the link 165 shown in Figs. 1, 2, 3 and 21 and functioning in substantially the same way. When the drive shown in Fig. 22 is used it replaces the parts 155, 168, 169, 164 and 165, shown in Figs. 1, 2, 3 and 21.

Figure 24:
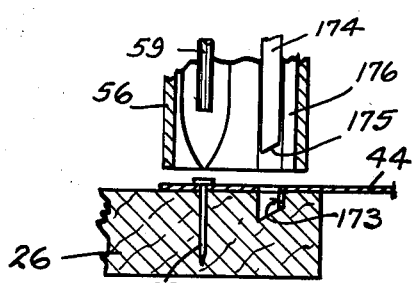
Fig. 24 is a fragmentary view partly in section and partly in elevation illustrating alternative means for securing a metal strap member to a band stock by the use of one nail instead of two nails.

In Fig. 24 I have illustrated alternative means for securing a metal strap member 44 to a band stick 26 by the use of one nail 63, instead of two nails. In accordance with the disclosure in Fig. 24 one nail 63 is driven through the strap member 44 into the band stick 26 near the end of the strap member and the strap member 44 is punched at a location outwardly from the nail 63 to partially cut loose a piece 173 of said strap member and bend said piece 173 downwardly and outwardly and embed it in the wooden band stick. The chief function of the downwardly bent piece 173 is to preserve the correct alignment of the strap member 44 and band stick 26 so that the band stick with the strap members 44 thereon is maintained in the most compact form for handling and in the most convenient form for use by the shingle packer. The downwardly bent piece 173 also offers some resistance to forces tending to pull the strap member loose from the bundle by an endwise pull on the strap member. When the strap member 44 is to be punched, as shown in Fig. 24, one of the nail driving plungers 59 is replaced by a punch member 174 which has an inclined punching end 175. When the punch member 174 is used then chuck jaw means 176 of modified shape is provided in place of the chuck jaw means 65 and 66, said chuck jaw means 176 being suitably shaped to guide the punch member 174.

Preparatory to operating this machine the band stick magazine 27 is supplied with band sticks 26, two rolls 102 of metal strap material 44 are provided and the metal strap 44 of each roll is properly threaded into the respective carriage or strap feeding means. Also the nail boxes 72 are supplied with nails 63. When the motor 142 is started and the machine put into operation the nails 63 will be fed to the nailing units, the band sticks 26 will be moved into nailing position, the metal strap members 44 will be properly positioned with their end portions in overlapped relation relative to the end portions of the band sticks, the nails will be driven, the metal straps will be cut off and punched and the band sticks with the metal straps nailed to the end portions thereof will be pushed forwardly and eventually discharged from the machine.

In a cycle of the machine the several operations will overlap in some instances, but will preferably occur in substantially the following order, it being assumed to begin with that the carriages or strap feeding devices are at the innermost limit of their movement. At this time a band stick 26 will be correctly positioned for nailing and the ends of the metal straps 44 will be correctly positioned above said band sticks. As the carriages move outwardly the nailing plungers and the punch and cutter members will move downwardly, thus simultaneously nailing the inner end portions of the metal straps 44 to the band stick 26 and punching and cutting off said metal straps at a predetermined distance outwardly from the respective ends of the band stick. In accordance with standard practice these metal straps 44 are cut off so that they are approximately eleven inches long. While the nailing plungers, punches, and cut off devices are doing their work, the carriages are being moved outwardly and the band stick feeder arms 28 are being moved rearwardly so as to allow another band stick 26 to drop down onto the angle members 25. As the nailing plungers, punches and cut off devices are being moved upwardly, the carriages complete their outward travel and start to move inwardly, the jaw members 108 and 109 take hold of the straps 44 at a new location preparatory to feeding said straps 44 inwardly and the band stick feeder bars 28 start to move forwardly preparatory to moving the next band stick 26 into position for nailing. While the nail driving plungers 59 are moving downwardly, the cam 97 engages with the plate 98 and moves the bar 93 to the right from the position shown in Fig. 10, far enough to start another nail moving downwardly in each tube 64. If the plungers are not retracted far enough to be clear of the nails by the time the nails reach the passageways 60, the nails will be momentarily stopped but will drop into the passageways 60 as soon as the plungers are retracted far enough to leave the passageways 62 clear, thus supplying another nail to each nail chuck to be used in the next nail driving operation.

After the machine is started it is fully automatic in the nailing operation and will nail two pieces of metal strap 44 to a band stick 26 at each cycle of operation. As the cycles are of short duration this gives the machine a very large capacity.

The ends of the metal straps 44 which are nailed in the machine are not previously punched as it has been found that the nails 63 will always penetrate the metal straps when said nails are poperly held in the nail driving chucks and driven by the plungers 59.

Obviously, changes may be made in the forms, dimensions, and arrangement of the parts of my invention, without departing from the principle thereof, the above setting forth only preferred forms of embodiment.

I claim:

1. A machine of the class described, comprising band stick supporting means positioned to support wooden band sticks in a substantially horizontal position; reciprocable band stick feeding means positioned to intermittently move band sticks in a direction transverse to their length on said supporting means; a reciprocable metal strap feeding carriage positioned substantially in longitudinal alignment with a band stick which is supported on said supporting means and operable to intermittently feed a metal strap member into a position with an end portion of the strap member overlapping an end portion of the band stick; nail driving means positioned above the overlapped end portions of said strap member and said band stick; operating devices connected with said nail driving means moving said nail driving means to nail said strap member to said band stick; a punch and cut off means positioned at a predetermined distance from said nail driving means; and devices operating said punch and cut off means to cut off said strap member at a predetermined distance from the end of said band stick and to punch holes in said strap member adjacent the cut off end thereof.

2. A machine of the class described, comprising a frame; two parallel spaced apart angle bars positioned on said frame with flanges extending toward each other providing means whereon the end portions of band sticks may rest supporting the band sticks in substantially horizontal position; band stick feeding means intermittently moving band sticks on said angle bars in a direction transverse to the length of the band sticks; track members on said frame projecting outwardly at substantially right angles from said angle bars; metal strap feeding carriages reciprocably supported on said track members positioned substantially in alignment with a band stick which is supported on said angle bars and operable to feed a metal strap member into a position of longitudinal alignment with a band stick with an end portion of the strap member overlapping an end portion of the band stick; nail driving means positioned above the overlapped end portions of said strap member and said band stick; operating devices connected with said nail driving means moving said nail driving means to nail said strap member to said band stick; a punch and cut off means positioned at a predetermined distance from said nail driving means; and devices operating said punch and cut off means to cut off said metal strap member at a predetermined distance from the end of said band stick and to punch holes in said metal strap member adjacent the cut off end thereof.

3. A machine of the class described, comprising a frame; band stick supporting means positioned on said frame; band stick feeding means operable to move wooden band sticks, which are positioned in edge to edge relation, intermittently on said band stick supporting means in a direction transverse to their length; metal strap feeding carriages positioned at the sides of the path of movement of said band sticks; means supporting said carriages for reciprocation toward and away from the band sticks in directions at right angles to the direction of movement of the band sticks; carriage reciprocating means connected with the carriages moving the carriages to feed metal strap members into end to end overlapped relation to the band sticks; nailing means nailing the overlapped end portions of the strap members to the band sticks; and punch and cut off means cutting off the strap members to predetermined lengths and punching said strap members adjacent their cut off ends.

4. A machine of the class described, comprising band stick supporting means operable to support a band stick; a reciprocable metal strap feeding carriage mounted for reciprocation toward and away from said band stick supporting means; a punch and cut off means positioned between said reciprocable carriage and said band stick supporting means; and an angularly movable metal strap guiding member operatively disposed between said punch and cut off means and said reciprocable carriage.

5. A machine of the class described, comprising band stick supporting means operable to support a band stick; a reciprocable metal strap feeding carriage mounted for reciprocation toward and away from said band stick supporting means; a punch and cut off means positioned between said reciprocable carriage and said band stick supporting means; two spaced apart guide plates adapted to receive therebetween and guide a metal strap member, said guide plates having longitudinally extending slots therein; fixed pivot means positioned at one side of the path of movement of a metal strap pivotally supporting one end portion of said guide plates adjacent said punch and cut off means; and pin means on said reciprocable carriage at the other side of the path of the metal strap slidable in the slots in said guide plates, whereby said metal strap will be continuously guided between said guide plates and said guide plates will be moved angularly out of the way of said carriage as said carriage moves toward said punch and cut off means.

6. A machine of the class described, comprising band sticks supporting means operable to support a band stick; a reciprocable metal strap feeding carriage mounted for reciprocation toward and away from said band stick supporting means; a punch and cut off means positioned between said reciprocable carriage and said band stick supporting means; a metal strap gripping member positioned adjacent said punch and cut off means operable to grip a metal strap tending to move therethrough in a direction away from the band stick supporting means and to release a metal strap tending to move therethrough toward the band stick supporting means; and another strap gripping means on said reciprocable carriage operable to grip and advance a metal strap as said carriage moves toward said punch and cut off means and to slide over the metal strap as the carriage moves away from the punch and cut off means.

7. A machine of the class described, comprising band stick supporting means positioned to support wooden band sticks in a substantially horizontal position; reciprocable band stick feeding means operative to intermittently move band sticks in a direction transverse to their length on said supporting means; a reciprocable metal strap feeding carriage positioned substantially in longitudinal alignment with a band stick which is supported on said supporting means and operable intermittently to feed a metal strap member into a position with an end portion of the strap member overlapping an end portion of the band stick; nail driving means positioned above the overlapped portions of said strap member and said band stick operable to nail a strap member to a band stick; punch and cut off means positioned at a predetermined distance from said nail driivng means operable to cut off the metal strap and punch holes adjacent the cut off end of the same; a fixed metal strap guide between said nail driving means and said punch and cut off means; a metal strap gripping member positioned adjacent said punch and cut off means operable to grip a metal strap if said strap tends to move away from the band sticks and to release a metal strap moving toward said band sticks; another strap gripping means on said reciprocable carriage operable to grip a metal strap as said carriage moves toward said band sticks and slide over the metal strap as the carriage moves in the opposite direction; and angularly movable metal strap guiding means positioned between said reciprocable carriage and said punch and cut off means.

8. A machine of the class described, comprising a frame; band stick supporting means on said frame; two nailing devices supported by said frame in spaced apart relation and above said band stick supporting means; two punch and cut off devices supported by said frame in outwardly spaced relation relative to the respective nailing devices; two reciprocable metal strap feeding carriages positioned outwardly from the respective punch and cut off devices; a rock shaft positioned above said nailing devices and said punch and cut off devices and operatively connected therewith; nail supply means connected with said nailing devices; operating devices connecting said nail delivery means and said rock shaft; rock shaft actuating means operatively connected with said rock shaft; band stick supply means positioned to deliver band sticks to said band stick supporting means; said band stick moving means positioned to move band sticks from said supply means over said supporting means.

9. A machine of the class described, comprising band stick supporting machines; and reciprocable strap feeding means operable to feed flexible metal strap toward said band stick supporting means, said strap feeding means comprising a carriage plate, track means for said carriage plate, rollers reciprocably supporting said carriage plate on said track means, two lever arms pivoted on said carriage plate, two jaw members connected with the respective lever arms adapted to receive a metal strap member and movable by angular movement of said levers to engage or disengage said strap, a bar slidably mounted on said carriage plate, links connected with said bar and with the outer end portions of said levers respectively opening and closing said jaws in response to longitudinal movement of said bar, means limiting the movement in one direction of said bar, the movement of said bar in the other direction being limited by engagement of said jaws with the metal strap, and carriage reciprocating means connected with said bar member.

MURDOCK F. McLEOD.